US009423865B2

(12) United States Patent
Bose et al.

(10) Patent No.: US 9,423,865 B2
(45) Date of Patent: *Aug. 23, 2016

(54) ACCELERATING MICROPROCESSOR CORE WAKE UP VIA CHARGE FROM CAPACITANCE TANK WITHOUT INTRODUCING NOISE ON POWER GRID OF RUNNING MICROPROCESSOR CORES

(71) Applicant: GLOBALFOUNDRIES INC., Grand Cayman (KY)

(72) Inventors: Pradip Bose, Yorktown Heights, NY (US); Alper Buyuktosunoglu, White Plains, NY (US); Hans Jacobson, White Plains, NY (US); Victor Zyuban, Yorktown Heights, NY (US)

(73) Assignee: GLOBALFOUNDRIES INC., Grand Cayman (KY)

(*) Notice: Subject to any disclaimer, the term of this patent is extended or adjusted under 35 U.S.C. 154(b) by 328 days.

This patent is subject to a terminal disclaimer.

(21) Appl. No.: 14/026,444

(22) Filed: Sep. 13, 2013

(65) Prior Publication Data

US 2015/0082069 A1    Mar. 19, 2015

(51) Int. Cl.
*G06F 1/26* (2006.01)
*G06F 1/32* (2006.01)

(52) U.S. Cl.
CPC .............. *G06F 1/3287* (2013.01); *G06F 1/26* (2013.01); *Y02B 60/1282* (2013.01)

(58) Field of Classification Search
CPC ....... G06F 1/32; G06F 1/3287; H01H 47/00; G05F 1/10
See application file for complete search history.

(56) References Cited

U.S. PATENT DOCUMENTS 5,457,421 A    10/1995    Tanabe
5,504,909 A     4/1996    Webster et al.
(Continued)

FOREIGN PATENT DOCUMENTS

CN    101004630 A    7/2007
EP      1037366 A2    9/2000
(Continued)

OTHER PUBLICATIONS

Kawaskaki et al. "A Sub- μs Wake-up Time Power Gating Technique with Bypass Power Line for Rush Current Support," Fujitsu Laboratories Ltd., 2008 Symposium on VLSI Circuits Digest of Technical Papers, 978-I-4244-1805-3/08, IEEE, 2 pages.

(Continued)

*Primary Examiner* — Fahmida Rahman
(74) *Attorney, Agent, or Firm* — Anthony Canale; Andrew M. Calderon; Roberts Mlotkowski Safran Cole & Calderon, P.C.

(57) ABSTRACT

A mechanism is provided for an integrated circuit with power gating. A power switch is configured to connect and disconnect circuits to a common voltage source. A capacitor tank is configured to supply wakeup charge to a given circuit. A controllable element is connected to the given circuit and to the capacitor tank. The controllable element is configured to controllably connect and disconnect the capacitor tank to the given circuit in order to supply the wakeup charge to the given circuit. The controllable element is configured to, responsive to the power switch disconnecting the given circuit from the common voltage source and to the given circuit being turned on to wakeup, supply the wakeup charge to the given circuit being turned on by transferring the wakeup charge from the capacitor tank to the given circuit. This reduces the electrical charge transferred from the circuits connected to the common voltage source.

11 Claims, 7 Drawing Sheets

(56) References Cited

U.S. PATENT DOCUMENTS

| | | |
|---|---|---|
| 6,721,885 B1 | 4/2004 | Freeman et al. |
| 6,927,619 B1 | 8/2005 | Doyle |
| 7,190,210 B2 | 3/2007 | Azrai et al. |
| 7,639,041 B1 | 12/2009 | Perisetty |
| 7,659,773 B2* | 2/2010 | Choi .................. G06F 1/26 327/142 |
| 8,190,939 B2 | 5/2012 | Fields, Jr. et al. |
| 8,327,163 B2 | 12/2012 | Chen |
| 8,519,772 B2 | 8/2013 | Chu et al. |
| 8,633,751 B2 | 1/2014 | Hegde |
| 2001/0033152 A1 | 10/2001 | Pohlman et al. |
| 2002/0089382 A1 | 7/2002 | Yang |
| 2003/0034792 A1 | 2/2003 | Ostrom et al. |
| 2005/0007178 A1 | 1/2005 | Fahim |
| 2005/0053228 A1 | 3/2005 | Mullins et al. |
| 2005/0091629 A1 | 4/2005 | Eisenstadt et al. |
| 2007/0001747 A1* | 1/2007 | von Kaenel ............ G06F 1/26 327/538 |
| 2008/0155280 A1 | 6/2008 | Hacking et al. |
| 2009/0235260 A1 | 9/2009 | Branover et al. |
| 2010/0097129 A1 | 4/2010 | Itoh et al. |
| 2010/0253244 A1 | 10/2010 | Snook et al. |
| 2011/0198681 A1 | 8/2011 | Shukuri et al. |
| 2011/0204724 A1 | 8/2011 | Verma et al. |
| 2011/0221399 A1 | 9/2011 | Sawataishi et al. |
| 2012/0025953 A1 | 2/2012 | Swanson et al. |
| 2013/0099570 A1 | 4/2013 | Manohar et al. |
| 2013/0198549 A1 | 8/2013 | Longnecker et al. |
| 2014/0097702 A1* | 4/2014 | Upputuri ............... G11O 5/063 307/115 |

FOREIGN PATENT DOCUMENTS

| | | |
|---|---|---|
| EP | 1318591 A2 | 11/2003 |
| EP | 2345969 A2 | 7/2011 |
| EP | 2424092 A1 | 2/2012 |
| WO | 03079417 A2 | 9/2003 |
| WO | 2005011260 | 2/2005 |
| WO | 2005094523 A2 | 10/2005 |

OTHER PUBLICATIONS

Mark Lehn et al, "A 0.13- 1-GS/s CMOS Discrete-Time FFT Processor for Ultra-Wideband OFDM Wireless Receivers", 2011; 12 pages.

Michael Powell et al, "Gated-Vdd—a circuit technique to reduce leakage in deep-submicron cache memories", 2000, Purdue University, School of Electrical and Computer Engineering, 6 pages.

Richard Strong et al, "Fast switching of threads between cores", ACM SIGOPS Operating Systems Review, vol. 43, Issue 2, Apr. 2009, pp. 35-45; 12 pages.

Office Action for related U.S. Appl. No. 14/171,836 dated Feb. 12, 2016; 24 Pages.

\* cited by examiner

ACCELERATING MICROPROCESSOR CORE WAKE UP VIA CHARGE FROM CAPACITANCE TANK WITHOUT INTRODUCING NOISE ON POWER GRID OF RUNNING MICROPROCESSOR CORES

BACKGROUND

The present invention relates to microprocessor core wake up, and more specifically, to waking up the microprocessor core with charge from a capacitor tank without introducing noise to other running microprocessor cores.

Power gating is a technique used in integrated circuit design to reduce power consumption, by shutting off the flow of current to blocks of the circuit that are not currently in use. Power gating also reduces stand-by or leakage power.

Power gating affects design architecture of the integrated circuit, and incurs time delays when a power gated component is required to be powered up to continue the execution of the program or application running on the computer, as power gated modes have to be safely entered and exited. Architectural trade-offs exist between designing for the amount of leakage power saving in low power modes and the energy dissipation to enter and exit the low power modes. Shutting down the blocks can be accomplished either by software or hardware. Driver software can schedule the power down operations, or hardware timers can be utilized. A dedicated power management controller is another option.

SUMMARY

According to an embodiment, an integrated circuit with power gating is provided. The integrated circuit includes a power switch configured to connect and disconnect any one of a plurality of circuits to a common voltage source, a capacitor tank configured to supply wakeup charge to a given circuit of the plurality of circuits, and a controllable element connected to the given circuit and to the capacitor tank. The controllable element is configured to controllably connect and disconnect the capacitor tank to the given circuit in order to supply the wakeup charge to the given circuit. The controllable element is configured to, responsive to the power switch disconnecting the given circuit from the common voltage source and to the given circuit being turned on to wakeup, supply the wakeup charge to the given circuit being turned on by transferring the wakeup charge from the capacitor tank to the given circuit thereby reducing an amount of electrical charge transferred from the plurality of circuits connected to the common voltage source.

According to an embodiment, a method of operating an integrated circuit with power gating is provided. The method includes configuring a power switch to connect and disconnect any one of a plurality of circuits to a common voltage source, configuring a capacitor tank to supply wakeup charge to a given circuit of the plurality of circuits, and configuring a controllable element, which is connected to the given circuit and to the capacitor tank, to controllably connect and disconnect the capacitor tank to the given circuit in order to supply the wakeup charge to the given circuit. Responsive to the power switch disconnecting the given circuit from the common voltage source and responsive to the given circuit being turned on to wake up, the controllable element is turned on to supply the wakeup charge to the given circuit being turned on by transferring the wakeup charge from the capacitor tank to the given circuit, thereby reducing an amount of electrical charge transferred from the plurality of circuits connected to the common voltage source.

According to an embodiment, a computer program product for operating an integrated circuit with power gating is provided. The computer program product has a computer readable storage medium having program code embodied therewith. The program code executable by a computer for configuring a power switch to connect and disconnect any one of a plurality of circuits to a common voltage source, configuring a capacitor tank to supply wakeup charge to a given circuit of the plurality of circuits, and configuring a controllable element, which is connected to the given circuit and to the capacitor tank, to controllably connect and disconnect the capacitor tank to the given circuit in order to supply the wakeup charge to the given circuit. Responsive to the power switch disconnecting the given circuit from the common voltage source and responsive to the given circuit being turned on to wake up, the controllable element is turned on to supply the wakeup charge to the given circuit being turned on by transferring the wakeup charge from the capacitor tank to the given circuit, thereby reducing an amount of electrical charge transferred from the plurality of circuits connected to the common voltage source.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
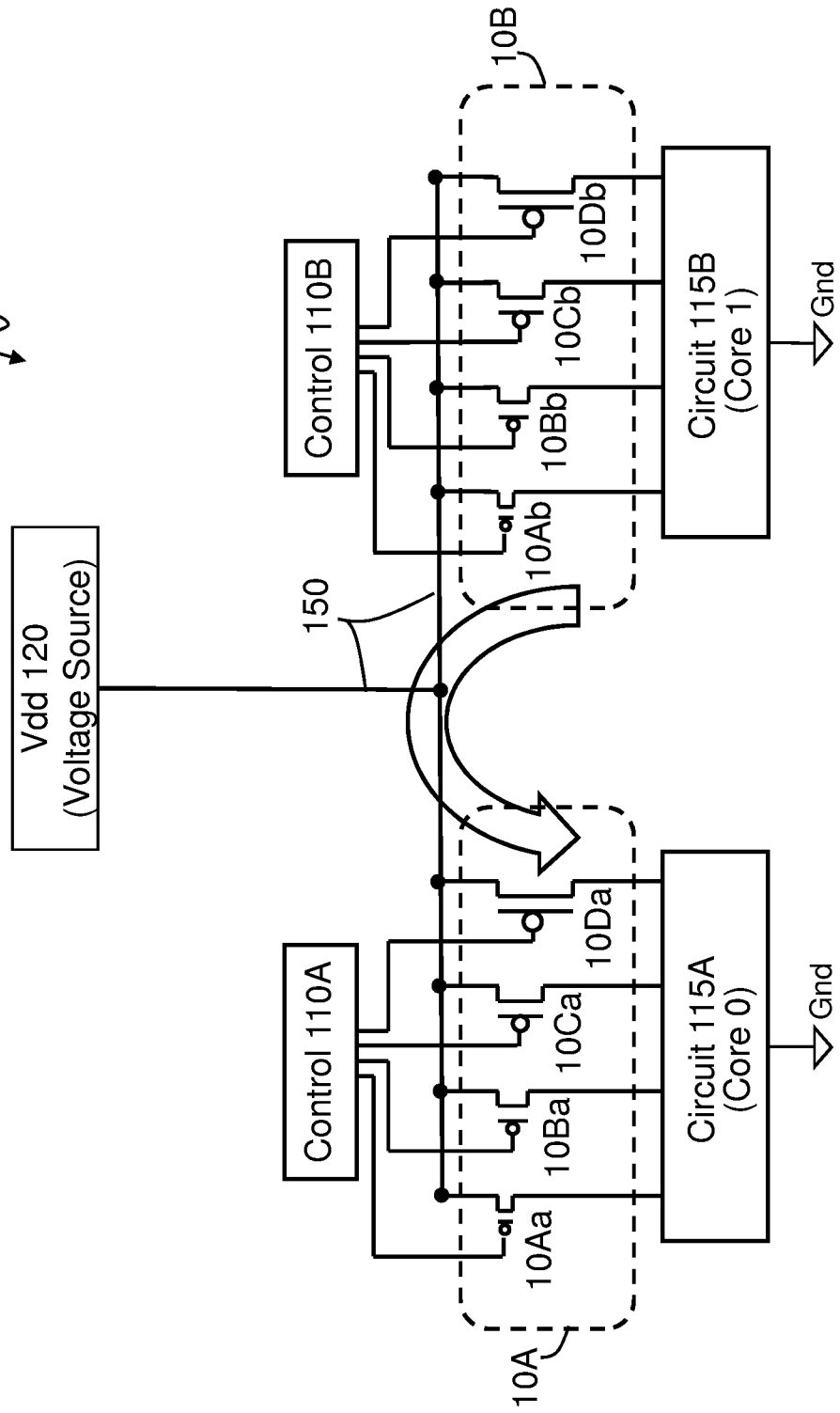
FIG. 1 illustrates a multistage multicore wakeup process of an integrated circuit.

Embodiments relate to integrated circuits and examples disclosed may relate to a general purpose multicore processor chip (G) attached to an accelerator (off-load engine) chip A. Due to the coordinated "back-and-forth" execution across such a system, in which spawning of accelerator threads by the main processor threads causes idle hardware G-threads on the processor side, and in which termination of accelerator threads causes idle hardware A-threads, there are significant opportunities for power gating of core/accelerator resources on both the G and A chips.

State of the art integrated systems may utilize core or sub-core (accelerator lane) level power gating. That is, one or more cores (or sub-cores) on a multicore processor can be turned off to conserve power. However, a key problem is the significant wakeup time for such a resource (i.e., core or sub-core), once it is determined that the resource is needed back as part of the available compute resources. The wakeup of such a resource is currently effected via the main (set of) header transistor(s) or switch(es) that is (are) turned back on, thereby connecting the power supply to the (power) gated resource. Since the header transistor(s) is (are) sized in such a manner as to provide sufficiently high threshold voltage (and so low leakage power), the turn-on time for the core or accelerator lane can be significant, depending on the size of the resource (i.e., core or accelerator lane) that is power gated. Also, using this method of core wakeup (i.e., powering the core back on after having been power off) makes it difficult to control inductive noise (Ldi/dt) effects that affect other cores on the power grid.

Embodiments provide techniques for core/accelerator wakeup (and wakeup of any circuit that is part of an integrated circuit), without creating inductive noise loading effects on the rest of the power distribution grid (i.e., without causing noise on currently running circuits (i.e., active running circuits), such as large voltage drops on the common power grid which can cause the running circuits to lose state information).

Embodiments provide the use of a separate (dedicated) capacitor tank, connected to the power grid, that is normally kept charged and ready to replenish or charge-up a power gated resource (such as a core and/or any type of circuit) quickly before the power gated resource is connected back up to the main power supply through the header transistor(s). A power gated resource is a circuit (such as an individual core) that has been powered off by disconnecting (via a switch such as the header transistors) the power gated circuit from the main power supply (i.e., the common/global power grid common to all cores on the multicore microprocessor). During the duration when the power gated resource is charged back up, the capacitor tank may be disconnected from the main supply (with the help of a multiplexor switch and/or pass transistor). Embodiments can also provide predictive control logic that proactively wakes up the power gated resource.

FIG. 1 illustrates a multistage multicore wakeup process of an integrated circuit 100. A common voltage source 120 is connected to header switches 10A and 10B. The common voltage source 120 may also be referred to as Vdd or common power supply.

The header switches 10A and 10B may generally be referred to as header switches 10. Also, the header switches 10A and 10B are known as power gating header devices or headers. The header switch 10A collectively includes header transistor 10Aa, header transistor 10Ba, header transistor 10Ca, and header transistor 10Da, all of which have their respective gate terminals connected a controller 110A for controlling signals (i.e., gate voltages) that individually turn on and turn off each respective header transistor 10Aa through 10Da. The source terminals of the header transistors 10Aa, 10Ba, 10Ca, and 10Da are respectively connected to the voltage source 120 to supply power to circuit 115A through their respective drain terminals. If a bipolar transistor is used for the power switch then the corresponding terminals of the device would be called base, emitter and collector terminals.

Similarly, the header switch 10B collectively includes header transistor 10Ab, header transistor 10Bb, header transistor 10Cb, and header transistor 10Db, all of which have their respective gate terminals connected a controller 110B for controlling signals (i.e., gate voltages) that individually turn on and turn off each respective header transistor 10Ab through 10Db. The source terminals of the header transistors 10Ab, 10Bb, 10Cb, and 10Db are respectively connected to the voltage source 120 to supply power to circuit 115B through their respective drain terminals.

The controller 110A operates as a power-up sequencer for circuit 115A, and the controller 110B operates as a power-up sequencer for circuit 115B. The respective power-up sequencers power on and/or power off the respective header transistors 10Aa through 10Da and respective header transistors 10Ab through 10Db. The circuits 115A and 115B are representative of circuits on any type of integrated circuit 100 such as a microprocessor. The circuit 115A may be core 0 and the circuit 115B may be core 1 on a single microprocessor connected to Vdd 120.

The controller 110A and controller 110B are generally referred to as controller 110 and each may be implemented as discrete logic circuits having logic gates for implementing logic functions, an application specific integrated circuit (ASIC) having appropriate combinational logic gates, programmable gate arrays (PGA), a field programmable gate array (FPGA), etc. as discussed herein. Also, the controller 110 may be firmware (such as a hypervisor), a minicontroller, or a state machine all of which include logic (minisoftware and/or hardware logic circuits) for operating as discussed herein to control the various transistors. The controller 110 may also run as part of the operating system.

When a circuit/core is being powered up, a significant amount of electrical charge is required to be supplied to the power grid of the circuit/core being powered up. The individual connections of the header switch 10A are the individual power grid for the circuit 115A (core 0) while the individual connections of the header switch 10B are the individual power grid for the circuit 115B. Because of the high inductance path from the core/global power grid 150 to the voltage source 120 (power supply), the charge cannot be supplied instantly from the voltage source 120 (power supply). Therefore if the core 0 is powered up too quickly, the charge needed to power up the core 0 grid (individual connections of the header switch 10A) is being supplied by the power grid (individual connections of the header switch 10A) of other running cores (such as circuit 115B of core 1) on the same chip (current path shown in semi-transparent circular line with arrow). This large draw of current causes noise on the power grid of the running cores (i.e., on the power grid header switch 10B of circuit 115B), potentially leading to the risk of a failure in one (e.g., circuit 115B) of the running cores. As an example of computing the amount of voltage noise that could be introduced on the power grids of the running cores when one of the cores is powered up while turning on all of the power switch transistors simultaneously, consider the following scenario. The processor chip has two cores, and each core has 0.1 micro Farad (μF) of total capacitance connected to the power grid including the decoupling capacitance and the internal capacitance of the circuits. The nominal operating voltage is Vdd=1.0V and the nominal current consumption of each core is 10 amps. The total gate width of the CMOS transistors comprising the power switch is 1 meter, capable of supplying the nominal current to each core at 10 millivolts of voltage drop between the source and drain terminals of the header switch CMOS transistors. Suppose that when core 0 is power gated, the voltage at its power grid is reduced to 0.1V due to the leakage current through the circuits of core 0 to the ground. In this example, simultaneously turning on all of the power switch transistors (of core 0) will result in an initial current (draw) of 1000 amps flowing through the power switch transistors into the decoupling capacitance and the internal capacitance of core 0. The electrical inductance of the chip package (e.g., the chip/integrated circuit 100) limits the rate of increase in the current flowing from the external voltage regulator into the circuit. For a package electrical inductance of 1 picoHenry (pH), the rate of current increase of 10 amps per nanosecond creates a voltage drop of 10 millivolts across the package electrical inductance. Thus, because of the electrical inductance of the package the external power supply (e.g., voltage source 120) can only supply approximately 10 amps of current out of the 1000 amps (which is 1%) of current flowing through the power switch into the decoupling and internal capacitance of core 0 within the first nanosecond after turning on the power switch transistors. The remaining 99% of current is supplied by all other capacitances connected to the source terminals of the power switch transistors, including the decoupling capacitance of the running core 1 (and other running cores 5). If the total capacitances of core 0 and core 1 are equal and no other significant decoupling on-chip capacitance is connected to the net 150, then the voltage at core 1 will drop to approximately ½ Vdd. If the processor chip has 20 cores connected to the same power supply net, then the voltage noise caused by turning on one of the power gated cores introduces the noise of approximately 1/20 Vdd (or 50 mV). In typical microprocessor design the maximum voltage noise on the power grid that can be tolerated without impacting the operation of the running cores is in the range of 10 mV. This example clearly demonstrates that simultaneously turning on all power switch transistors of a power gated core introduces a significant level of power supply noise on the running cores, potentially leading to failures in the running cores.

Therefore, in the state of the art in order to power up a core (e.g., core 0), the controller 110A (power-up sequencer) generates control signals for the transistors of the header switch 10A, turning them in stages. Turning on header transistor 10Aa is the first stage, turning on header transistor 10Ba is the second stage, turning on header transistor 10Ca is the third stage, and turning on header transistor 10Da is the last stage, wherein each transistor is larger than the previous (i.e., allowing more current to flow). Typically, a small section of the header switch 10A is turned during the first stages of the wake-up sequence in order to bring up the power grid of the core from the power-down level to a level close to the external power supply (i.e., close to Vdd of voltage source 120), before the next, bigger stage of the header switch is turned on. This multistage process for powering up a core (e.g., core 0) leads to a significant increase in the power-up latency.

Further details of the latency are provided as an example of waking up circuit 115A (core 0) after having been turned off/powered down. When waking up the circuit 115A, the controller 110A first enables the first header transistor 10Aa, and then waits until the introduced noise on the power grid (i.e., on connections of header switch 10B) settles. Then, the controller 110A enables the second header transistor 10Ba and then waits until the introduced noise on the power grid (i.e., on connections of header switch 10B) settles. Next, the controller 110A enables third header transistor 10Ca and then waits until the introduced noise on the power grid settles. Finally, the controller 110A enables the last (biggest) header transistor 10Da. These steps/stages take time to walk through and so introduce latency in waking up a power gated circuit (i.e., the power gated circuit 115A). The following example shows the typical latency of powering up a power gated core (i.e., powered off core) without introducing a significant amount of noise on the power grid of the running cores. In order to power-up the core the power switch transistor is partitioned into four to ten stages (note that four stages are shown in power switch transistors 10A and 10B). The total gate width of transistors in the first stage is typically set to 0.01% to 0.1% of the total gate width of the transistors of the power switch (e.g., power switch transistors 10A). Limiting the gate width of the transistors in the first stage to 0.1% reduces the current flowing into the decoupling capacitance of the power gated core 0 from 1000 amps in the earlier example to approximately 1 amp. This amount of current increase can be provided by the off-chip power supply within 0.1 nanosecond without exceeding the 10 mV limit on the allowed power supply noise. The total transistor sizes of the second stage of the power switch can be set to be a factor of 2× to 10× of the first stage, and so on. Thus, in order to turn on 100% of the power switch gate width, starting with 0.01% of the gate width at stage 1 and increasing the gate width by factor of 2× between every two stages, the total of 13 stages are required (computed as a base-2 logarithm of the ratio of the total gate width to the gate width of the first stage). Using a more aggressive turn-on sequence, starting with 0.01% of the gate width at stage 1 and increasing the gate width by factor of 4× between every two stages, the total of 7 stages are required (computed as a base-4 logarithm of the ratio of the total gate width to the gate width of the first stage). In order to avoid the interaction between consecutive stages in the power-up process, the turning on of any two consecutive stages must be separated by a time interval of between hundreds of nanosecond to tens of microseconds, resulting in a total wake up latency of up to hundreds of microseconds.

Embodiments reduce the latency of the core wakeup process discussed above.

Figure 2:
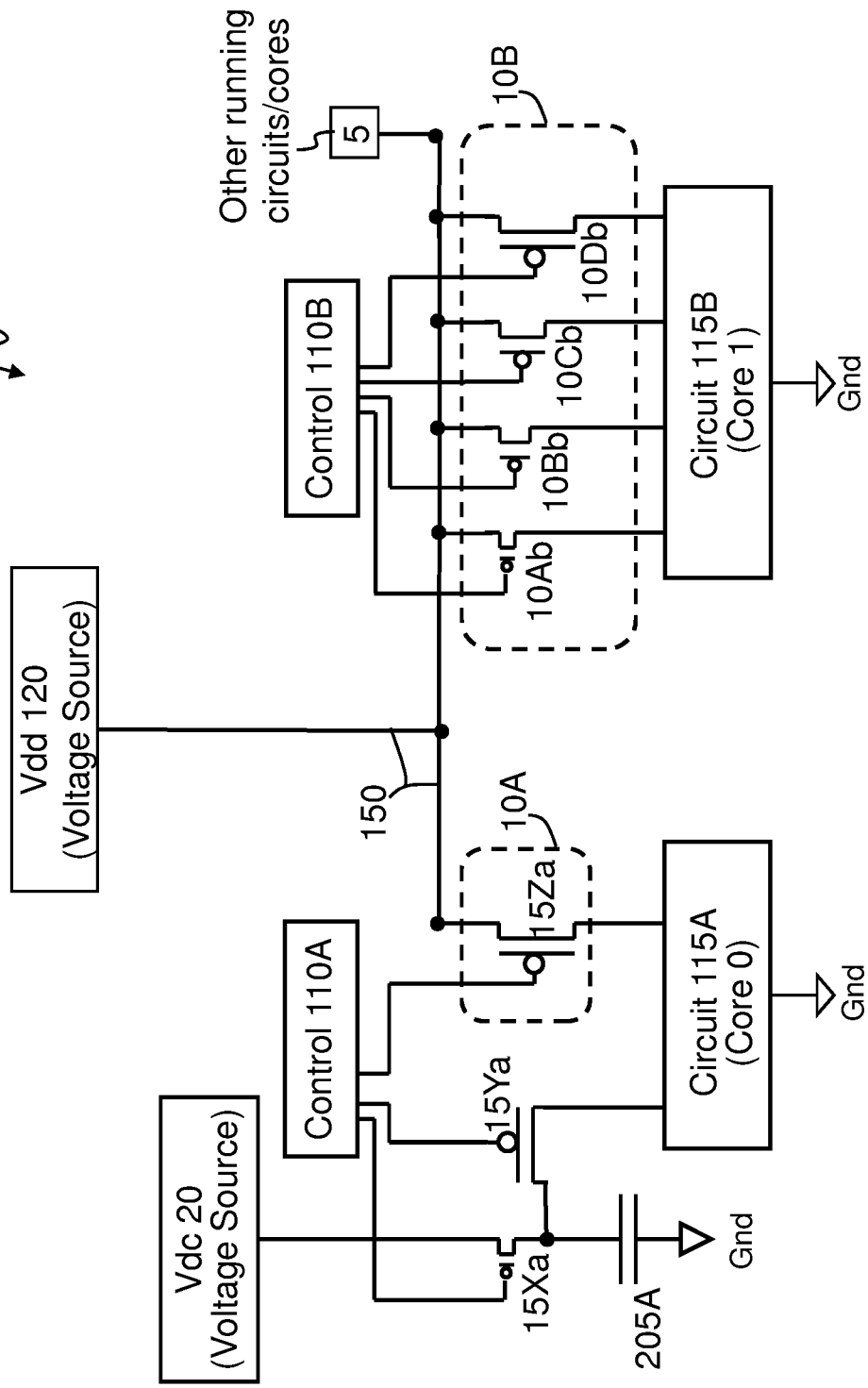
FIG. 2 illustrates charging a power gated circuit of the integrated circuit from a capacitor tank according to an embodiment.

FIG. 2 illustrates charging the power gated circuit (e.g., circuit 115A of the integrated circuit 100) from a capacitor tank 205A according to an embodiment. The integrated circuit 100 has been modified with a disconnect-able capacitor (charge) tank 205A to supply charge to the powered up core (e.g., circuit 115A) without introducing noise in the running cores (such as the running circuit 115B and other running circuits/cores 5 on the global power grid 150). Note that the common voltage source 120 is common (i.e., connected to) all of the circuits 115A and 115B and other running circuits 5 via the global power grid 150.

The capacitor tank 205A may be a large capacitor and/or one or more large capacitors connected, e.g., in parallel, to provide voltage to the circuit 115A. The amount of electrical capacitance provided by the capacitor tank 205A can range between 1 micro Farad (μg) to 100 μF, depending of the implementation of the capacitor tank 205, the technology used, and chip area allocated for it. In order to avoid introducing a significant amount of noise on the power rails of the running cores, the tank capacitor must be implemented either as an on-chip capacitance, or a package mounted capacitance. For an on-chip capacitance implemented using a deep trench technology the total capacitance of the capacitor tank is in the range of 1 μF to 10 μF. For an on-chip capacitance implemented as gates of thick-oxide CMOS transistors the total capacitance is in the range of 0.1 µF to 1 µF. When using a package-mounted capacitance, the total capacitance of 100 µF can be achieved. The higher the capacitance value of the capacitor tank the higher the precharge voltage of the core undergoing the power-up process. For example, if the sum of the internal capacitance and the decoupling capacitance of core 0 is 0.1 µF, then using the capacitor tank 205 with 1 µF of capacitance and Vdc set equal to Vdd, results in the precharge voltage of 10/11*Vdd. If a capacitor tank 205 with 2 µF is used, then the precharge voltage of 20/21*Vdd is achieved. The closer the precharge voltage to Vdd the smaller the amount of power supply noise introduced by turning on 100% of the power switch transistors (e.g., the power switch transistors 10A) after the pre-charge process has been completed.

The integrated circuit 100 in FIG. 2 illustrates a modification to the header switch 10A. In this embodiment, header switch 10A only includes large header transistor 15Za. The large header transistor 15Za is configured to handle the combined (summed) current flow of the previous header transistors 10Aa, 10Ba, 10Ca, and 10Da all at once (without waiting for noise to settle on the global power grid 150). For example, the large header transistor 15Za may have the combined power rating of header transistors 10Aa, 10Ba, 10Ca, and 10Da. (The same applies by analogy to large header transistor 15Zb for header transistors 10Ab, 10Bb, 10Cb, and 10Db discussed below) The header transistor 15Za has its gate connected and controlled by the controller 110A, has its source connected to the common voltage source 120, and its drain connected to the circuit 115A just as discussed for the previous header transistors 10Aa, 10Ba, 10Ca, and 10Da.

The capacitor tank 205A is charged through a voltage feeding transistor 15Xa connected to a capacitor voltage source 20. The capacitor voltage source 20 supplies voltage Vdc. In one case the voltage source 20 may be the same as voltage source as 120 (and/or have the same voltage). The value of voltage Vdc may equal voltage Vdd, or value of voltage Vdc may be set higher than voltage Vdd. When Vdc is connected to the same voltage source as Vdd (that is Vdc equals Vdd and/or voltage source 20 is the same as voltage source 120), the circuit 115A would only be charged from the capacitor tank 205A to voltage Vdd*tank_capacitance/(tank_capacitance+core_capacitance). Thus, if the capacitance of the tank capacitor equals the core capacitance, then the precharge voltage equals ½ Vdd. If the capacitance of the tank capacitor is two times larger than the core capacitance, then the precharge voltage equals ⅔Vdd.

In another case, the voltage source 20 may be an external voltage source. The voltage Vdc may be higher than voltage Vdd. For example, when Vdc is equal to twice Vdd (e.g., 2*Vdd), then the circuit 115A would be charged from the capacitor tank 205A to voltage Vdd instead of Vdd/2, if the capacitance of the tank capacitor 205A equals the sum of the core internal capacitance and decoupling capacitance.

The capacitor tank 205A is connected to the circuit 115A through transistor 15Ya. The gate of the transistor 15Ya is connected to and controlled (i.e., turned on and off) by the controller 110A. The source of transistor 15Ya is connected to one end (i.e., one plate) of the capacitor tank 205A and the drain is connected to the circuit 115A.

Initially, the controller 110A is configured to turn off transistor 15Ya and turn on voltage feeding transistor 15Xa to charge the capacitor tank 205A from capacitor voltage source 20 (i.e., Vdc). It is assumed that circuit 115A is power gated because the controller 110A has turned of the header transistor 15Za such that no current flows through header transistor 15Za to the circuit 115A.

When it is time for the controller 110A to wake up the circuit 115A from the power gated state, the controller 110A is configured to turn off voltage feeding transistor 15Xa, correspondingly (at the same time and/or nearly the same time) turn on transistor 15Ya, and maintain the turned off control of header transistor 15Za. In one case, there is a limited amount of overlap between turning off voltage feeding transistor 15Xa and turning on the voltage feeding transistor 15Ya. However, it may be desired that there is no time overlap between the overlap between turning off voltage feeding transistor 15Xa and turning on the voltage feeding transistor 15Ya in order to minimize the voltage noise on the ground distribution network (e.g., network 150). At this point, charge (current) now flows from the capacitor tank 205A to the circuit 115A (core 0) via the turned on transistor 15Ya, in order to charge the circuit 115A to the voltage V_precharge. Once the circuit 115A is charged to the voltage V_precharge (e.g., as determined by controller 110A), the controller 110A is configured to turn off transistor 15Ya and turn on transistor 15Za. When Vdc is equal to twice Vdd (i.e., 2*Vdd), the circuit 115A has now been charged to the equivalent voltage of V_precharge=Vdd, and/or when Vdc is equal to Vdd, the circuit has not been charged to one half Vdd (i.e., V_precharge=½ Vdd). The controller 110A is configured to now turn on header transistor 15Za which connects the circuit 115A to the common power source 120 without introducing noise; no noise is introduced (to the running circuit 115B) because there is no (large) draw of current on the voltage source 120 when the circuit 115A is connected because the circuit 115A has previously been supplied/charged with current from the capacitor tank 205A. The controller 110A is configured to charge the circuit 115A the rest of the way (e.g., to Vdd when the circuit 115A was not charged to the value of Vdd), and then maintain the power required to operate the circuit 115A. Also, the controller 110A reconnects the capacitor tank 205A to the capacitor voltage source 20 through transistor 15Xa.

In order to increase the precharge voltage of the power core undergoing the power-up process, it may be beneficial that the Vdc is set at a higher voltage than Vdd. In order to minimize the amount of noise introduced when turning on the power switch 15Aa, the precharge voltage should be as close to the Vdd voltage as possible. The formula for computing the precharge voltage is as follows: V_precharge=Vdc*tank_capacitance/(tank_capacitance+core_capacitance). The following Table 1 illustrates a typical set of combination of the ratio of the capacitance of the capacitor tank to the core capacitance (capacitance_ratio) and the voltage Vdc used in a particular embodiment along with the resulting precharge voltage V_precharge at the core 0 undergoing the power up process.

TABLE 1

| Capacitance_ratio | Vdc | Precharge_voltage |
|---|---|---|
| 1.0 | Vdd | ½ Vdd |
| 2.0 | Vdd | 2/3 Vdd |
| 3.0 | Vdd | 3/4 Vdd |
| 5.0 | Vdd | 5/6 Vdd |
| 1.0 | 2*Vdd | Vdd |
| 2.0 | 1.5*Vdd | Vdd |
| 3.0 | 1.33*Vdd | Vdd |
| 4.0 | 1.25*Vdd | Vdd |

The last four rows in the Table 1 are used in the particular embodiment to achieve the voltage at the precharge process equal to the voltage of the power supply, which allows the turning on of the power switch 15Aa while introducing the minimum amount of noise on the running cores.

The described process of making the electrical charge stored in the capacitor tank 205 available for powering up of a power gated circuit is referred to as the charge transfer in this disclosure and in the claims. The electrical charge transferred to the circuit undergoing the power-on process is referred to as "wakeup electrical charge" or "wakeup charge" in this disclosure.

Figure 3:
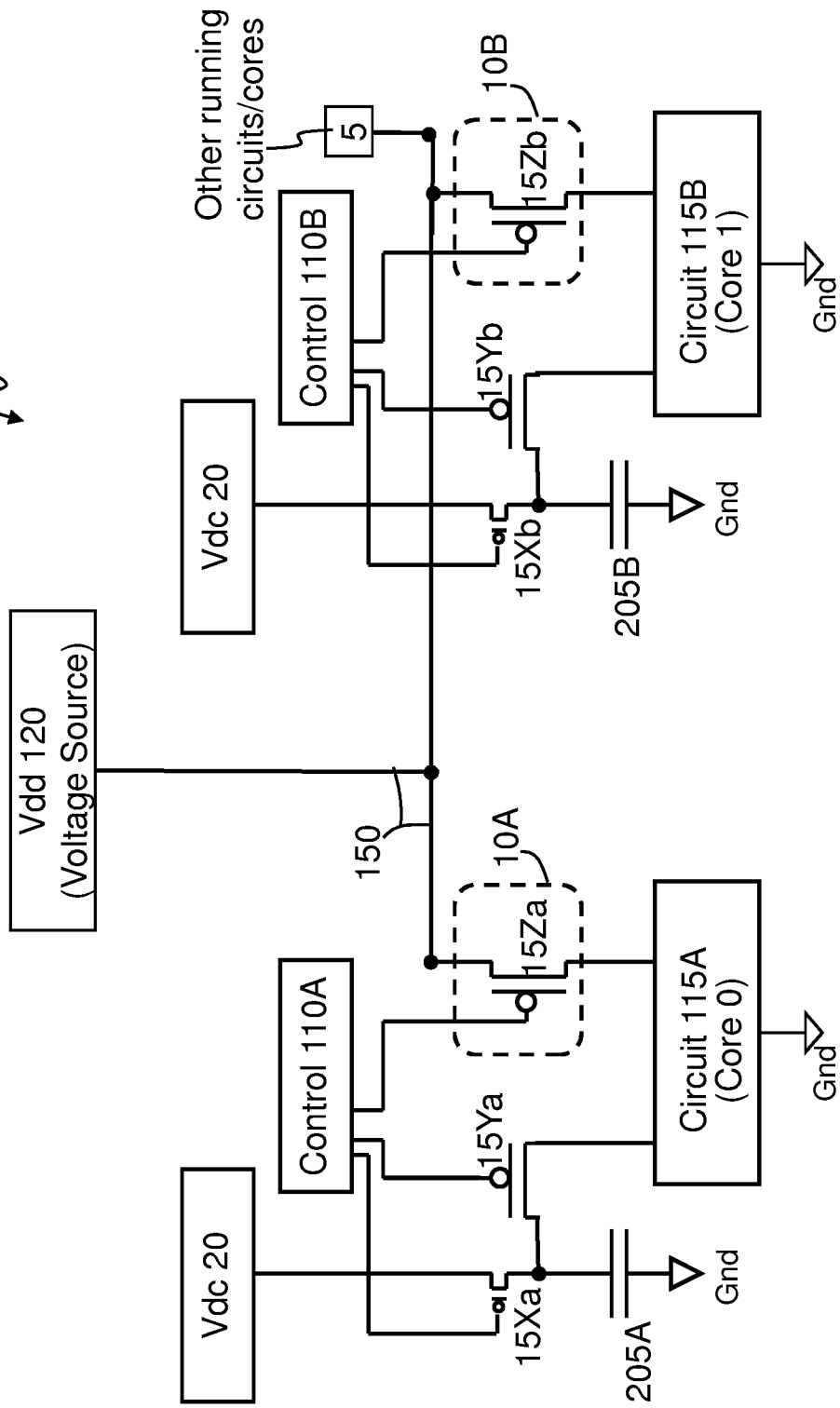
FIG. 3 illustrates charging circuits of the integrated circuit from separate capacitor tanks according to an embodiment.

FIG. 3 illustrates charging circuits 115A and 115B of the integrated circuit 100 from separate capacitor tanks 205A and 205B according to an embodiment.

The elements in FIG. 2 discussed for circuit 115A are analogous in operation and electrical connections for circuit 115B in FIG. 3. Assume that the power gated circuit is the circuit 115B (core 1) of the integrated circuit 100) which can be connected to the capacitor tank 205B to supply charge to the core (e.g., circuit 115A) being powered up without introducing noise in the running cores (such as the running circuit 115A and running circuits 5).

As noted above, the capacitor tank 205B may be a large capacitor and/or one or more large capacitors connected, e.g., in parallel, to provide voltage to the circuit 115B. As similarly discussed above for header switch 10A, the header switch 10B only includes large header transistor 15Zb. The large header transistor 15Zb is configured to handle/process the combined current flow of the previous header transistors 10Ab, 10Bb, 10Cb, and 10Db. The header transistor 15Zb has its gate connected and controlled by the controller 110B, has its source connected to the common voltage source 120, and its drain connected to the circuit 115B just as discussed for the previous header transistors 10Ab, 10Bb, 10Cb, and 10Db.

The capacitor tank 205B is charged through voltage feeding transistor 15Xb connected to the voltage source 20. Note that the capacitor voltage source 20 is the same voltage source connected to both voltage feeding transistors 15Xa and 15Xb. The voltage source 20 has supply voltage Vdc. In one case the voltage source 20 may be the same as voltage source as 120 (and/or have the same voltage). The value of voltage Vdc may equal voltage Vdd. When Vdc is connected to the same voltage source as Vdd (that is Vdc equals Vdd and/or voltage source 20 is the same as voltage source 120), the circuit 115B would only be charged from the capacitor tank 205B to voltage Vdd/2 (when using the capacitor tank 205B with its total capacitance equal to the capacitance of the core (circuit 115B)).

In another case, the voltage source 20 may be an external voltage source. The voltage Vdc may be higher than voltage Vdd. For example, when Vdc is equal to 2*Vdd, then the circuit 115B would be charged from the capacitor tank 205B to the full value of voltage Vdd instead of Vdd/2 (even when using the capacitor tank 205B with its total capacitance equal to the capacitance of the core (circuit 115B)).

The capacitor tank 205B is connected to the circuit 115B through transistor 15Yb. The gate of the transistor 15Yb is connected to and controlled (i.e., turned on and off) by the controller 110B. The source of transistor 15Yb is connected to one end (i.e., one plate) of the capacitor tank 205B and the drain is connected to the circuit 115B.

In this example, initially the controller 110B is configured to turn off transistor 15Yb and turn on transistor 15Xb to charge the capacitor tank 205B from voltage source 20 (i.e., Vdc). It is assumed that circuit 115B is power gated because the controller 110B has turned off the header transistor 15Zb such that no current flows through header transistor 15Zb to the circuit 115B. In FIG. 3, the same voltage source 20 is connected to both transistors 15Xa and 15Xb to respectively charge capacitor tanks 205A and 205B, when the controllers 110A and 110B respectively turn on transistors 15Xa and 15Xb.

When it is time for the controller 110B to wake up the circuit 115B from the power gated state, the controller 110B is configured to turn off transistor 15Xb, correspondingly (at the same time and/or nearly the same time) turn on transistor 15Yb, and maintain the turned off control of header transistor 15Zb.

At this point, charge (current) now flows from the capacitor tank 205B to the circuit 115B (core 1) via the turned on transistor 15Yb, in order to charge the circuit 115B to the voltage V_precharge. Once the circuit 115B is charged to the voltage V_precharge (e.g., as determined by controller 110B), the controller 110B is configured to turn off transistor 15Yb and turn on transistor 15Zb. When Vdc is equal to twice Vdd (i.e., 2*Vdd), the circuit 115B has now been charged to the equivalent voltage of Vdd, and/or when Vdc is equal to Vdd, the circuit has not been charged to one half Vdd (i.e., V_precharge=½ Vdd). The controller 110B is configured to now turn on large header transistor 15Zb which connects the circuit 115B to the common power source 120 without introducing noise; no noise is introduced (to the running circuit 115A) because there is no (large) draw of current on the voltage source 120 when the circuit 115B is connected because the circuit 115B has previously been supplied/charged with current from the capacitor tank 205B. The controller 110B is configured to charge the circuit 115B the rest of the way (e.g., to Vdd when the circuit 115B was not charged to the value of Vdd), and then maintain the power required to operate the circuit 115B. In the particular embodiment (discussed) the precharge voltage is within 100 mV of the external power supply voltage Vdd (V_precharge>0.9*Vdd), which is achieved using a combination of increasing the capacitance of the capacitor tank 205 compared to the core capacitance and increasing the tank capacitor precharge voltage above the core power supply (i.e., Vdc>Vdd), as shown in the Table 1 earlier in this disclosure. This allows turning on 100% of the power header switch (e.g., the power header switch 10B) simultaneously, without introducing any significant amount of voltage noise of the running cores. The calculations earlier in the disclosure show that in the prior art implementation of the wake-up process, the power switch turn-on sequence is broken into multiple stages (e.g., from 4 to 15 stages), potentially requiring hundreds of microseconds to complete the power-on process. However, the particular embodiment disclosed herein allows the power-up process to complete in a single stage, thus reducing the power-up latency by factor of 4× to 15×).

An important additional benefit of turning on the power switch transistors in a single step, allowed by the particular embodiment, is the simplification of the design of the power header switch and more efficient area utilization by the power switch devices.

As illustrated in FIG. 3, there may be more than one circuit 115A and 115B (which may generally be referred to as circuits 115) with each having its own capacitor tank 205A and 205B. For example, there may be 4, 5, 6, 7, etc., circuits 115 respectively connected to its own capacitor tank 205 with circuit elements discussed herein, such that the individually connected capacitor tank 205 supplies charge as noted above.

Figure 4:
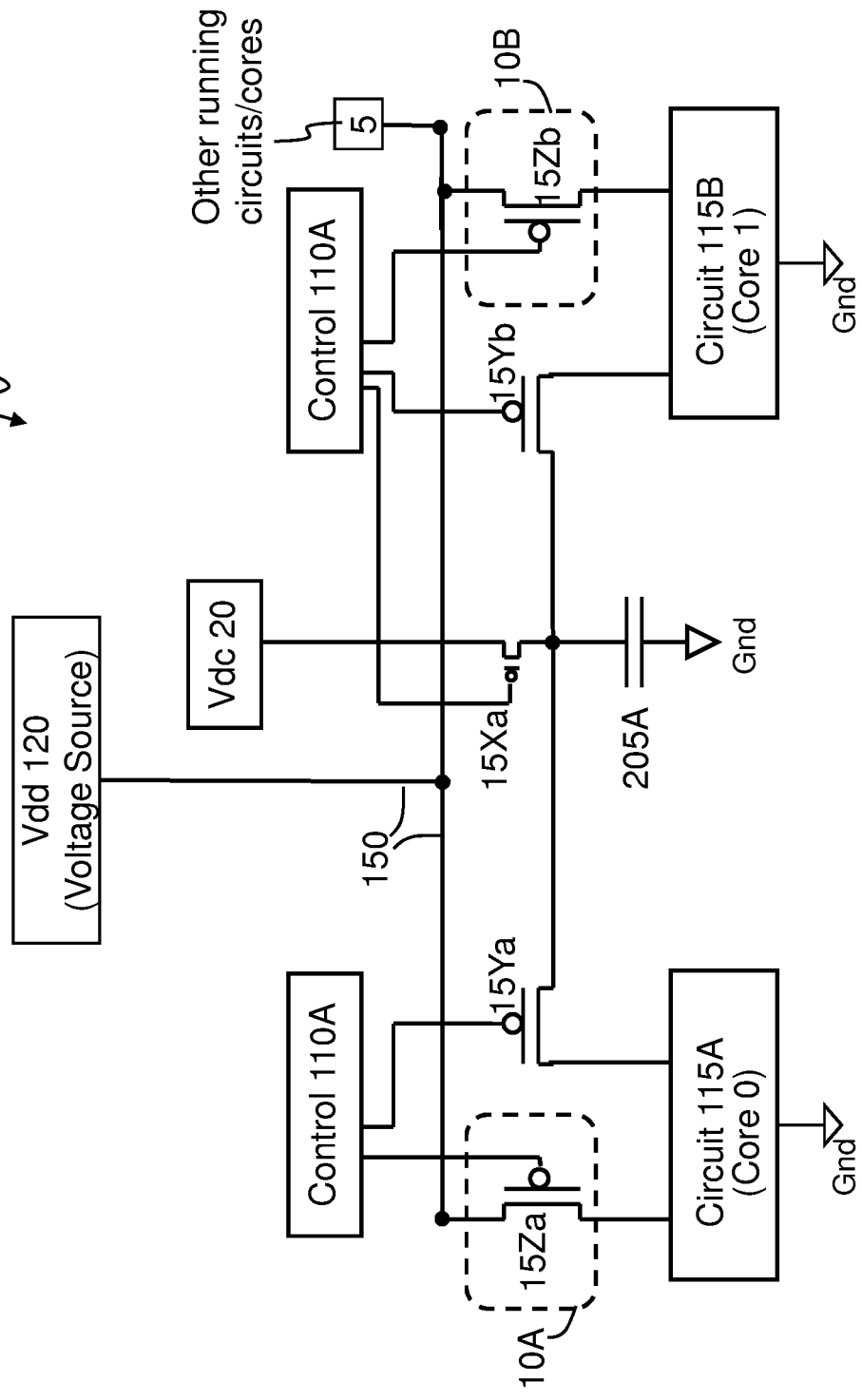
FIG. 4 illustrates charging circuits of the integrated circuit from a shared capacitor tank utilizing a shared controller according to an embodiment.

FIG. 4 illustrates charging circuits 115A and 115B of the integrated circuit 100 from a shared capacitor tank 205A utilizing a shared controller 110A according to an embodiment. In contrast to FIG. 3, FIG. 4 shows that the capacitor tank 205B has been removed. Also, the single controller 110A controls all circuit elements related to both circuits 115A and 115B.

In FIG. 4, the shared controller 110A (note that controller 110B is not utilized in this embodiment) is connected to the gate terminals of transistors 15Za, 15Zb, 15Ya, 15Yb, and 15Xa. Transistor 15Za has its source terminal connected to the common voltage source 120 (Vdd) and its drain terminal connected to the circuit 115A, in order for the transistor 15Za to provide voltage Vdd to the circuit 115A according to control signals from the controller 110A. Likewise, transistor 15Zb has its source connected to the common voltage source 120 (Vdd) and its drain connected to the circuit 115B, in order for the transistor 15Zb to provide voltage Vdd to the circuit 115B according to control signals from the controller 110A.

Transistor 15Ya has its source connected to the shared capacitor tank 205A and its drain connected to the circuit 115A. The controller 110A is configured to turn on the transistor 15Ya in order to supply current from the shared capacitor tank 205A to the circuit 115A. Similarly, transistor 15Yb has its source connected to the shared capacitor tank 205A and its drain connected to the circuit 115B. The controller 110A is configured to turn on the transistor 15Yb in order to supply current from the shared capacitor tank 205A to the circuit 115B.

The shared capacitor tank 205A is charged by the voltage source 20 (Vdc) through transistor 15Xa, which is controlled by the controller 110A. The disconnectable shared capacitor tank 205A (via respective transistors 15Ya and 15Yb) supplies current to the particular core (e.g., circuit 115A or 115B) being powered up from a power gated state without introducing noise in the running cores.

An example scenario is provided for illustration purposes and not limitation. It is assumed that circuits 115A and 115B are both power gated such that transistors 15Za and 15Zb are turned off. To wake up circuit 115A or 115B, transistor 15Xa is first turned off (as shared capacitor tank 205A has been fully charged).

If circuit 115A wakes up first, 15Ya is turned on and circuit 115A becomes charged to V_precharge after which transistor 15Ya is turned off again (via controller 110A). Transistor 15Za can now be turned on to charge circuit 115A the rest of the way to Vdd (assuming V_precharge is less than Vdd) without causing significant noise on the global power grid 150 (i.e., any other running circuits/cores connected to the common voltage source 120). If circuit 115B wakes up immediately (e.g., 5 milliseconds (ms)) and/or less after circuit 115A (but before the transistor 15Xa is turned on to recharge shared capacitor 205), transistor 15Yb is turned on and circuit 115B is charged to a voltage lower than V_precharge after which transistor 15Yb is turned off again.

Figure 5:
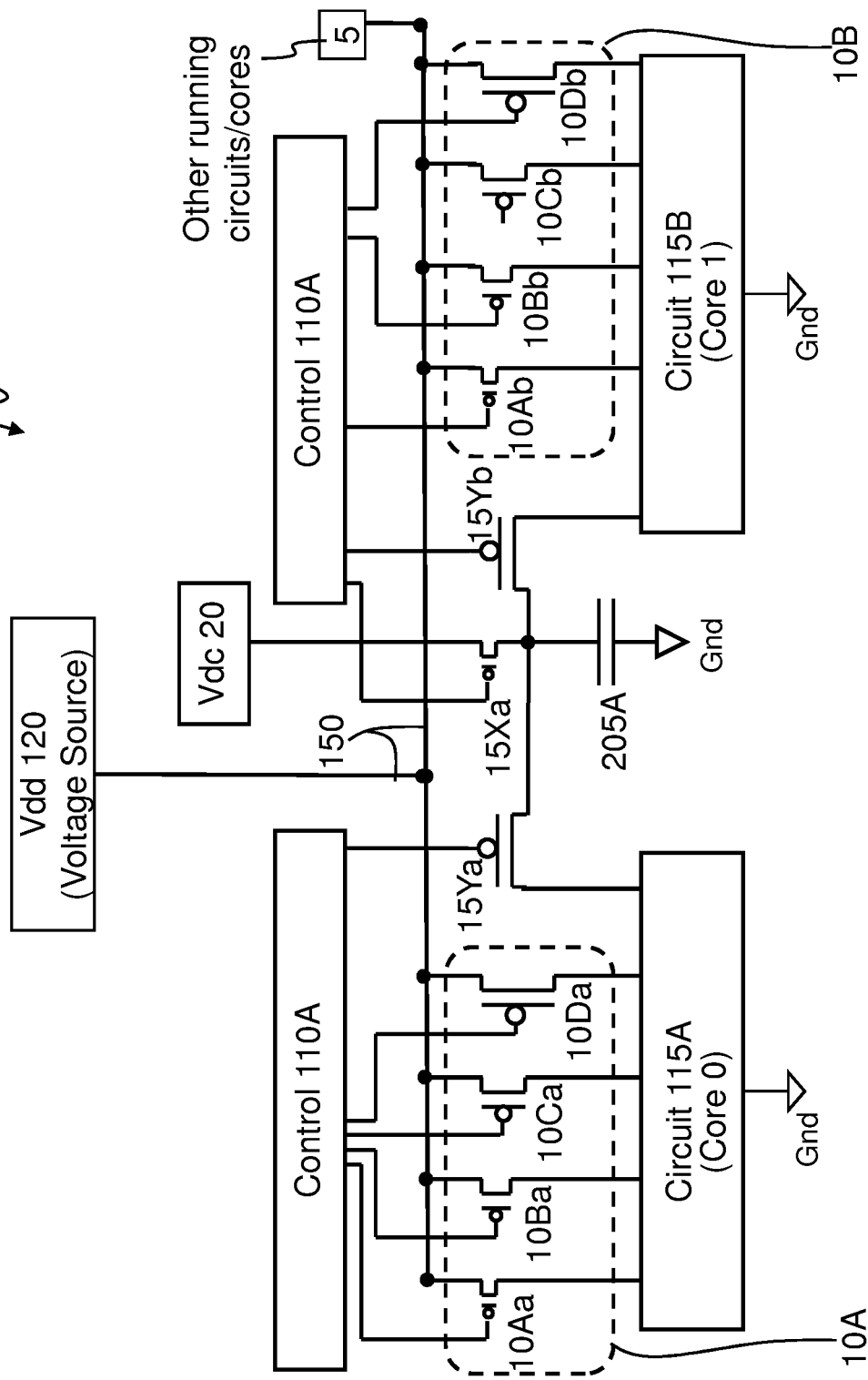
FIG. 5 illustrates charging the circuits from the shared capacitor tank using a multistep wakeup according to an embodiment

Since the shared capacitor tank 205A was not able to recharge to voltage Vdc before being required to provide its remaining charge to circuit 115B, the circuit 115B might need to enable a subset of transistor 15Za to charge circuit 115B the rest of the way to Vdd in multiple steps/stages in order to not cause too much noise on the global power grid 150, as shown in FIG. 5. These steps/stages are fewer than what would be required in the state of the art which needs to bring up circuit 115B all the way from ground (GND) to voltage Vdd, and FIG. 5 still allows a faster wakeup time than state of the art even in this case.

Now turning to FIG. 5, an illustration is provided of charging the circuits 115A and 115B from the shared capacitor tank 205A using a multistep wakeup according to an embodiment. The illustration will return to the above scenario to wake up circuit 115A or 115B in which transistor 15Xa is first turned off. If circuit 115A wakes up first, transistor 15Ya is turned on and circuit 115A gets charged to V_precharge after which transistor 15Ya is turned off again. Header transistors 10Aa, 10Ba, 10Ca, and 10Da (previously built into transistor 15Za) are now all (simultaneously or nearly simultaneously) turned on (via controller 110A) to charge circuit 115A the rest of the way to Vdd without causing significant noise on the global power grid 150 (e.g., without causing noise on other currently running circuits/cores connected to and voltage source 120).

At the point discussed above (in FIG. 4), if circuit 115B wakes up immediately after circuit 115A (but before the shared capacitor tank 205A has the opportunity to recharge), transistor 15Yb is turned on and circuit 115B is charged to Vdc/4 (via the shared capacitor tank 205A) after which transistor 15Yb is turned off again. The circuit 115B now needs to enable a subset of header switches 10B to charge circuit 115B the rest of the way to voltage Vdd in two (or multiple) steps in order to not cause too much noise on the global power grid 150. In the first stage, header transistors 10Ab, 10Bb, and 10Cb are all turned on (simultaneously and/or nearly simultaneously), and in the second stage header transistor 10Db is turned on. Again, these stages are fewer than what would be required in the state of the art which needs to bring up circuit 115B all the way from GND to Vdd in four separate stages (as discussed in FIG. 1) which include first turning on header transistor 10Ab and waiting for the noise to settle, then turning on header transistor 10Bb, next turning on header transistor 10Cb, and last turning on header transistor 10Db.

Note that the transistors 15Xa, 15Xb, 15Ya, 15Yb, 15Za, and 15Zb may be metal oxide semiconductor field effect transistors (MOSFET).

Figure 6:
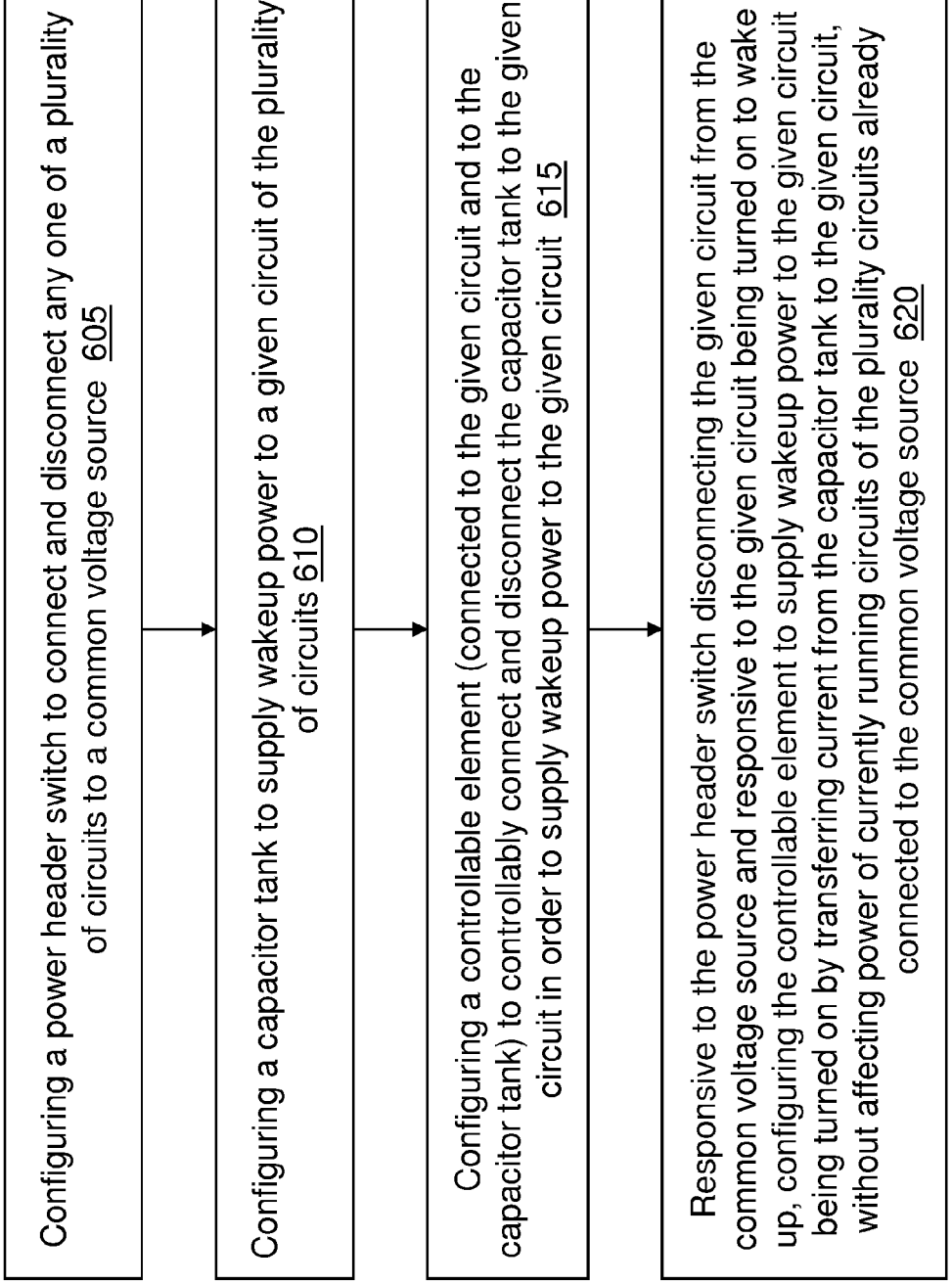
FIG. 6 illustrates a method of operating the integrated circuit with power gating according to an embodiment

Now turning to FIG. 6, a method 600 is illustrated for operating an integrated circuit 100 with power gating according to an embodiment. Reference can be made to FIGS. 2-5 (along with FIG. 7 discussed below).

The controller 110 (which represents the controllers 110A and 110B) is configured to control (via gate voltage/signals) the power header switches 10A and 10B (which may be header transistors 15Za and 15Zb) to connect and/or disconnect to any one of a plurality of circuits 115A and 115B to the common voltage source 120 at block 605.

The controller 110 is configured to control/cause the capacitor tank 205 (which generally represents the capacitor tanks 205A and 205B) to supply wakeup power to a given circuit (e.g., circuit 115A) of the plurality of circuits at block 610.

The controller 110 is configured to control a controllable element (such as, e.g., transistor 15Ya and 15Yb) connected to the given circuit (e.g., circuit 115A) and to the capacitor tank 205A, where the controller 110A controls the controllable element (e.g., transistor 15Ya) to controllably connect and disconnect the capacitor tank 205A to the given circuit 115A in order to supply wakeup power to the given circuit 115A at block 615.

Responsive to the power header switch (e.g., transistor 15Az of power header switch 10) disconnecting the given circuit 115A from the common voltage source 120 and responsive to the given circuit 115 being turned on to wake up (by controller 110A), the controllable element (e.g., transistor 15Ya) is configured to supply wakeup power to the given circuit 115 being turned on by transferring current from the capacitor tank 205A to the given circuit 115A, without affecting power of currently running circuits (such as circuit 115B and circuits 5 ) of the plurality circuits already connected to and receiving current from the common voltage source 120 at block 620.

The voltage feeding transistor 15Xa (15Xb) is connected to the capacitor tank 205A (205B) and the capacitor voltage source 20. The controller 110A controls the voltage feeding transistor 15Xa to connect the capacitor voltage source to the capacitor tank 205A in order to charge the capacitor tank 205A when no circuit of the plurality of circuits 115A and 115B is connected to the capacitor tank 205A for supplying wakeup power.

The power header switch 10A for the given circuit 115A is turned on to connect the given circuit 115A to the common voltage source 120 based on the controllable element (e.g., transistor 15Xa) connecting the given circuit 115A to the capacitor tank 205A being turned off. The power header switch 10A for the given circuit 115A is turned on as a single header transistor 15Za (e.g., as shown in FIGS. 2-4) in which the single header transistor 15Za does not require a sequence of header transistors (e.g., header transistors 10Aa, 10Ba, 10Ca, and 10Da) to consecutively turn on before the power header switch 10A supplies full current (combined power rating of header transistors 10Aa, 10Ba, 10Ca, and 10Da) from the common voltage source 120 to the given circuit 115A.

Another controllable element (e.g., transistor 15Yb) connected to another given circuit 115B and to the shared capacitor tank 205A such that the shared capacitor tank 205A is shared by both the given circuit 115A and the another given circuit 115B in order to respectively supply wakeup power (as shown in FIG. 4). The another given circuit 115B receives less supply wakeup power from the shared capacitor tank 205A, after the given circuit 115A has previously received supply wakeup power and when the shared capacitor tank 205A is not recharged by the capacitor voltage source 20. The power header switch 10B for the another given circuit 115B is turned on to connect the another given circuit 115B to the common voltage source 20, based on the another controllable element (e.g., transistor 15Yb) disconnecting the another given circuit 115B from the capacitor tank 205A (by the controller 110A). When the another given circuit 115B receives less supply wakeup power from the shared capacitor tank 205A, the controller 110A is configured to turn on the power header switch 10B for the another given circuit 115B which includes turning on at least one of a first header transistor through a last header transistor (header transistors 10Ab, 10Bb, 10Cb, 10Db) according to an amount of current received by the another given circuit 115B from the shared capacitor tank 205A (after charge was previously provided to circuit 115A) (as shown in FIG. 5).

The controller 110B (shown in FIG. 3) is configured to control (i.e., turns on and off) another capacitor tank 205B to supply wakeup power to another given circuit 115B of the plurality of circuits. The other controllable element (e.g., transistor 15Yb) is connected to the other given circuit 115B and to the other capacitor tank 205B, such that the other controllable element (transistor 15Yb) can controllably connect and disconnect the other capacitor tank 205B to the given circuit 115B for supplying wakeup power. Responsive to the power header switch 10B disconnecting the other given circuit 115B from the common voltage source 120 and responsive to the other given circuit 115B being turned on to wake up (by the controller 110B), the controller 110B causes the other controllable element (transistor 15Yb) to supply wakeup power to the other given circuit 115B being turned on by transferring current from the other capacitor tank 205B to the given circuit 115B, without affecting power of currently running circuits (e.g., circuit 115A and circuits 5) of the plurality circuits already connected to the common voltage source 120.

Figure 7:
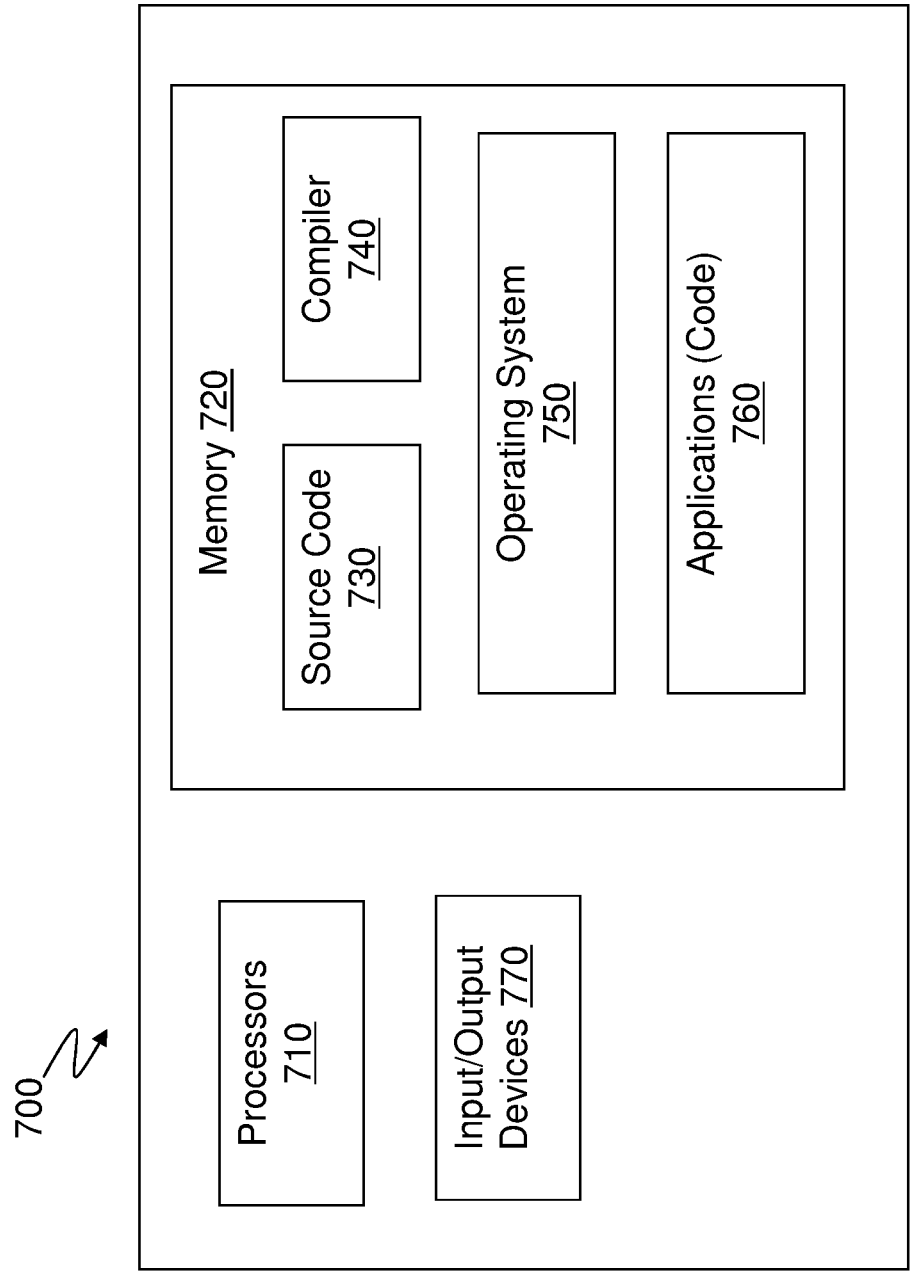
FIG. 7 is a block diagram that illustrates an example of a computer (computer setup) having capabilities, which may be included in and/or combined with embodiments.

Now turning to FIG. 7, an example illustrates a computer 700 (e.g., any type of computer system that includes and/or operates one or more integrated circuits 100) that may implement features discussed herein. The computer 700 may be a distributed computer system over more than one computer. Various methods, procedures, modules, flow diagrams, tools, applications, circuits, elements, and techniques discussed herein may also incorporate and/or utilize the capabilities of the computer 700. Indeed, capabilities of the computer 700 may be utilized to implement features of exemplary embodiments discussed herein.

Generally, in terms of hardware architecture, the computer 700 may include one or more processors 710, computer readable storage memory 720, and one or more input and/or output (I/O) devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a data signal processor (DSP), or an auxiliary processor among several processors associated with the computer 700, and the processor 710 may be a semiconductor based microprocessor (in the form of a microchip) or a macroprocessor.

The computer readable memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor(s) 710.

The software in the computer readable memory 720 may include one or more separate programs, each of which comprises an ordered listing of executable instructions for implementing logical functions. The software in the memory 720 includes a suitable operating system (O/S) 750, compiler 740, source code 730, and one or more applications 760 of the exemplary embodiments. As illustrated, the application 760 comprises numerous functional components for implementing the features, processes, methods, functions, and operations of the exemplary embodiments.

The operating system 750 may control the execution of other computer programs, and provides scheduling, input-output control, file and data management, memory management, and communication control and related services.

The application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as (a) an object oriented programming language, which has classes of data and methods, or (b) a procedure programming language, which has routines, subroutines, and/or functions.

The I/O devices 770 may include input devices (or peripherals) such as, for example but not limited to, a mouse, keyboard, scanner, microphone, camera, etc. Furthermore, the I/O devices 770 may also include output devices (or peripherals), for example but not limited to, a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or an intranet. The I/O devices 770 may be connected to and/or communicate with the processor 710 utilizing Bluetooth connections and cables (via, e.g., Universal Serial Bus (USB) ports, serial ports, parallel ports, FireWire, HDMI (High-Definition Multimedia Interface), etc.).

In exemplary embodiments, where the application 760 is implemented in hardware, the application 760 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An integrated circuit with power gating, the integrated circuit comprising:
    a power switch configured to connect and disconnect at least one of a plurality of circuits to a common voltage source;
    a capacitor tank configured to exclusively supply wakeup charge to a given circuit of the plurality of circuits;
    a first controller configured to control a controllable element;
    a second controller configured to control another controllable element, wherein the second controller is implemented as a discrete logic circuit from the first controller;
    the controllable element connected to the given circuit and to the capacitor tank, the controllable element configured to:
        controllably connect and disconnect the capacitor tank to the given circuit in order to supply the wakeup charge to the given circuit; and
        responsive to the power switch disconnecting the given circuit from the common voltage source and to the given circuit being turned on to wakeup, supply the wakeup charge to the given circuit being turned on by transferring the wakeup charge from the capacitor tank to the given circuit thereby reducing an amount of electrical charge transferred from the plurality of circuits connected to the common voltage source;
    another capacitor tank configured to exclusively supply wakeup charge to another given circuit of the plurality of circuits, the another given circuit being different from the given circuit;
    the another controllable element connected to the another given circuit and to the another capacitor tank, the another controllable element being configured to controllably connect and disconnect the another capacitor tank to the another given circuit for supplying the wakeup charge, wherein the power switch is turned on as a single header transistor without the need for multistage switching.

2. The integrated circuit of claim 1, further comprising a feed transistor connected to the capacitor tank and a capacitor voltage source;
    wherein the feed transistor is controllable to connect the capacitor voltage source to the capacitor tank in order to charge the capacitor tank when no circuit of the plurality of circuits is connected to the capacitor tank for supplying the wakeup charge.

3. The integrated circuit of claim 2, wherein the feed transistor connects the capacitor tank to the capacitor voltage source which charges the capacitor tank to a voltage potential higher than the common power source.

4. The integrated circuit of claim 1, wherein the power switch for the given circuit is turned on as the single header transistor, in which the single header transistor does not require a sequence of header transistors to consecutively turn on before all of the header transistors of the power switch are turned on to connect the common voltage source to the given circuit.

5. The integrated circuit of claim 1, further comprising:
wherein responsive to the power switch disconnecting the another given circuit from the common voltage source and responsive to the another given circuit being turned on to wake up, the another controllable element is configured to supply the wakeup charge to the another given circuit being turned on by transferring electrical charge from the another capacitor tank to the another given circuit, without affecting power of currently running circuits of the plurality of circuits already connected to the common voltage source.

6. An integrated circuit with power gating, the integrated circuit comprising:
a power switch configured to connect and disconnect at least one of a plurality of circuits to a common voltage source;
a capacitor tank configured to supply wakeup charge to a given circuit of the plurality of circuits;
a first controller configured to control a controllable element and another controllable element;
the controllable element connected to the given circuit and to the capacitor tank, the controllable element configured to:
controllably connect and disconnect the capacitor tank to the given circuit in order to supply the wakeup charge to the given circuit; and
responsive to the power switch disconnecting the given circuit from the common voltage source and to the given circuit being turned on to wakeup, supply the wakeup charge to the given circuit being turned on by transferring the wakeup charge from the capacitor tank to the given circuit thereby reducing an amount of electrical charge transferred from the plurality of circuits connected to the common voltage source;
the capacitor tank configured to supply wakeup charge to another given circuit of the plurality of circuits, the another given circuit being different from the given circuit;
wherein another controllable element connected to the another given circuit and to the capacitor tank, the another controllable element being configured to controllably connect and disconnect the capacitor tank to the another given circuit for supplying the wakeup charge,
wherein the another controllable element being connected to the another given circuit and to the capacitor tank such that the capacitor tank is shared by both the given circuit and the another given circuit in order to respectively supply the wakeup charge to either of the two circuits,
wherein the controller is configured to detect whether the another given circuit receives a smaller amount of the wakeup charge from the capacitor tank as compared to the wakeup charge received by the given circuit, after the given circuit has previously received the wakeup charge and when the capacitor tank is not recharged by a capacitor voltage source.

7. The integrated circuit of claim 6, wherein the power switch for the another given circuit is turned on to connect the another given circuit to the common voltage source, based on the another controllable element disconnecting the another given circuit from the capacitor tank; and
wherein when the another given circuit receives the smaller amount of the wakeup charge from the capacitor tank as compared to the wakeup charge received by the given circuit, turning on the power switch for the another given circuit includes turning on at least one of a first header transistor through a last header transistor according to an amount of electrical charge received by the another given circuit from the capacitor tank.

8. A non-transitory computer program product for operating an integrated circuit with power gating, the computer program product comprising a computer readable storage medium having program code embodied therewith, the program code executable by a computer for:
configuring a power switch to connect and disconnect at least one of a plurality of circuits to a common voltage source;
configuring a capacitor tank to exclusively supply wakeup charge to a given circuit of the plurality of circuits;
wherein a first controller is configured to control a controllable element;
wherein a second controller is configured to control another controllable element, wherein the second controller is implemented as a discrete logic circuit from the first controller;
configuring the controllable element, which is connected to the given circuit and to the capacitor tank, to controllably connect and disconnect the capacitor tank to the given circuit in order to supply the wakeup charge to the given circuit; and
responsive to the power switch disconnecting the given circuit from the common voltage source and responsive to the given circuit being turned on to wake up, turning on the controllable element to supply the wakeup charge to the given circuit being turned on by transferring the wakeup charge from the capacitor tank to the given circuit, thereby reducing an amount of electrical charge transferred from the plurality of circuits connected to the common voltage source;
wherein another capacitor tank is configured to exclusively supply wakeup charge to another given circuit of the plurality of circuits, the another given circuit being different from the given circuit;
wherein the another controllable element is connected to the another given circuit and to the another capacitor tank, the another controllable element being configured to controllably connect and disconnect the another capacitor tank to the another given circuit for supplying the wakeup charge, wherein the power switch is turned on as a single header transistor without the need for multistage switching.

9. The computer program product of claim 8, wherein a feed transistor is connected to the capacitor tank and a capacitor voltage source;
wherein the feed transistor is controllable to connect the capacitor voltage source to the capacitor tank in order to charge the capacitor tank when no circuit of the plurality of circuits is connected to the capacitor tank for supplying the wakeup charge.

10. The computer program product of claim 8, the feed transistor connects the capacitor tank to a capacitor voltage source which charges the capacitor tank to a voltage potential higher than the common power source.

11. The computer program product of claim 10, wherein the power switch for the given circuit is turned on as the single header transistor, in which the single header transistor does not require a sequence of header transistors to consecutively turn on before all of the headers transistors of the power switch are turned on to connect the common voltage source to the given circuit.

* * * * *